No. 777,335. Patented December 13, 1904.

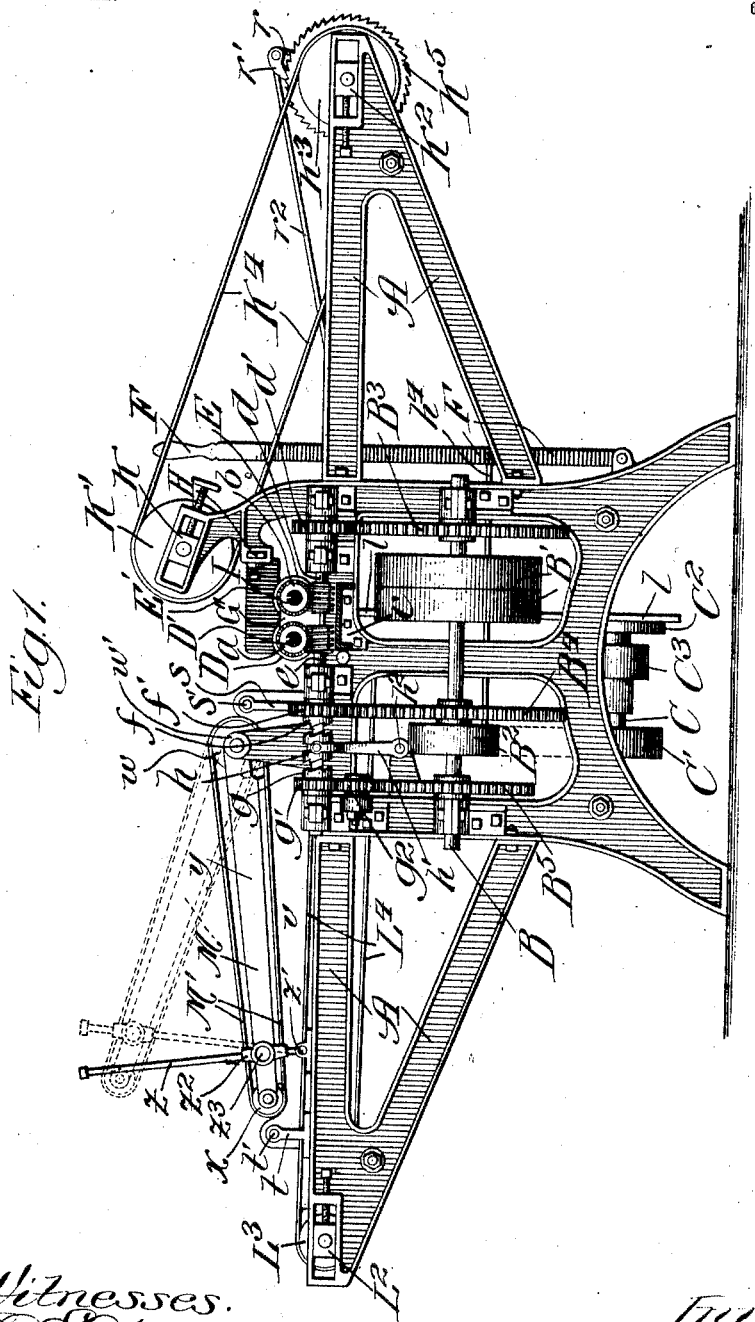

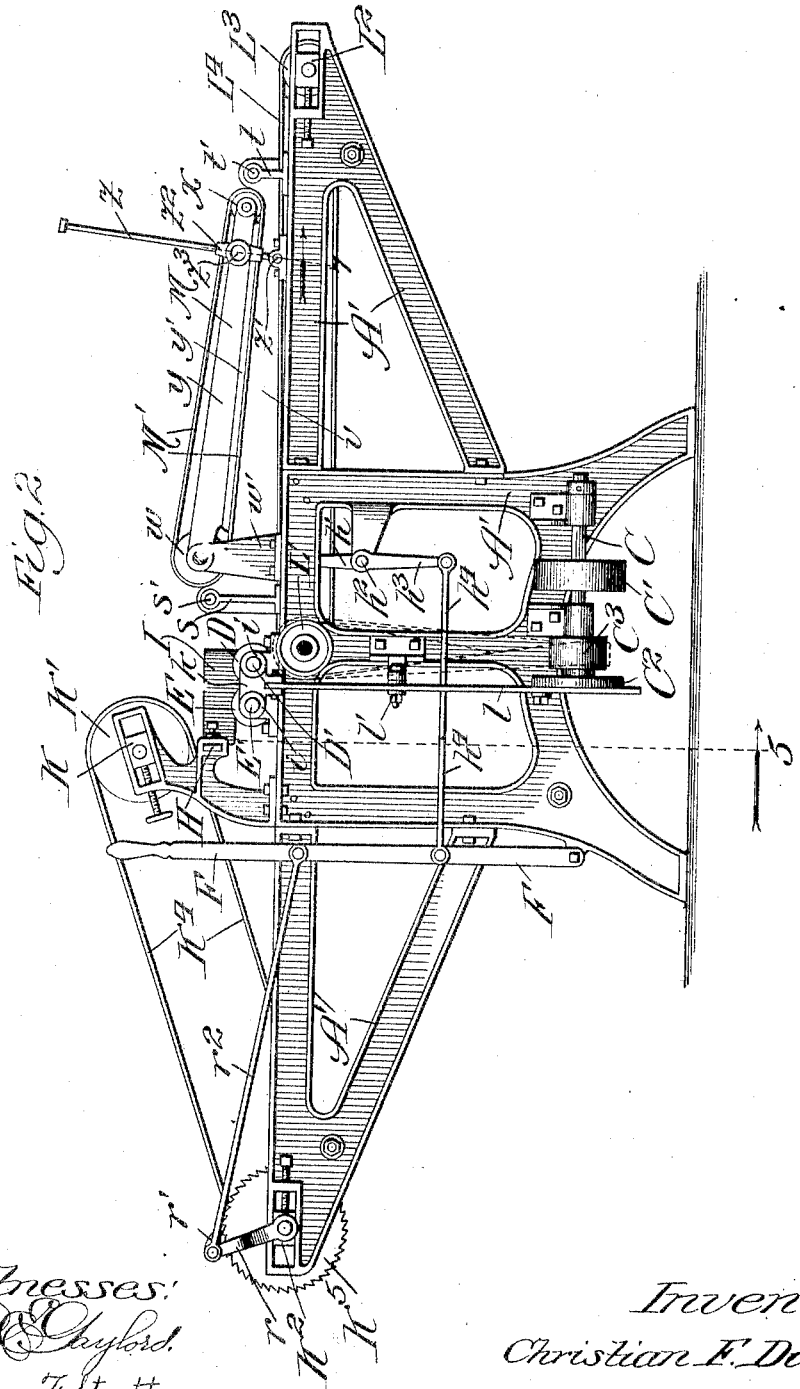

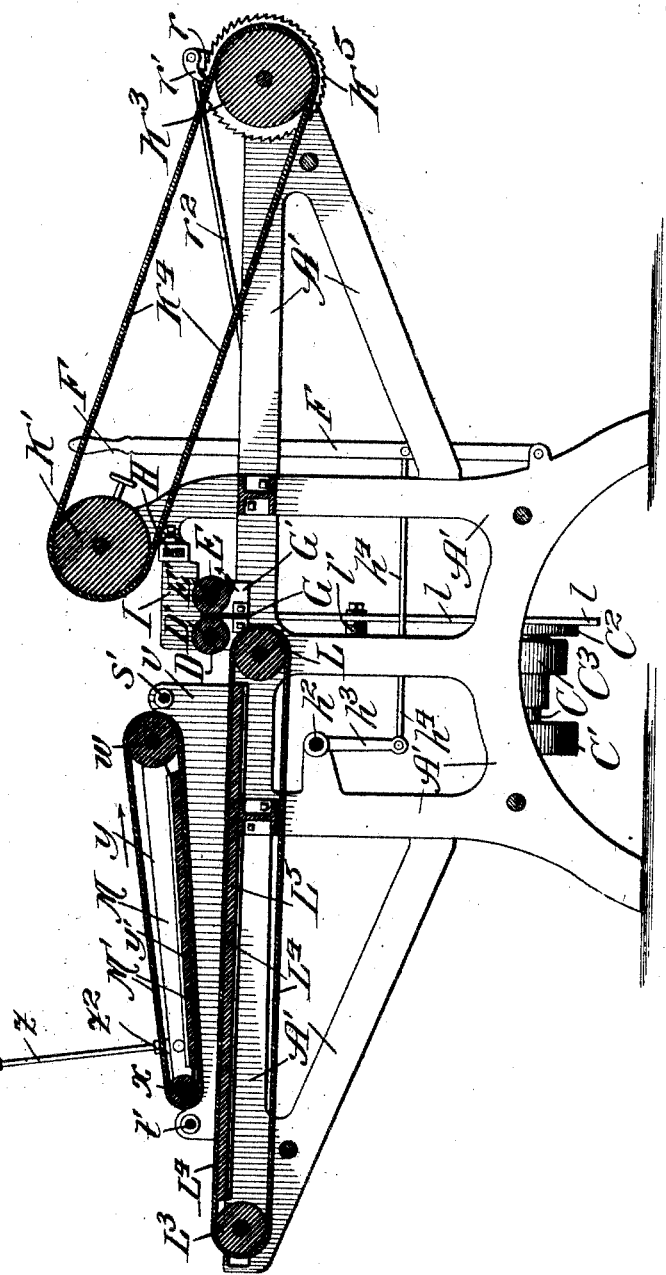

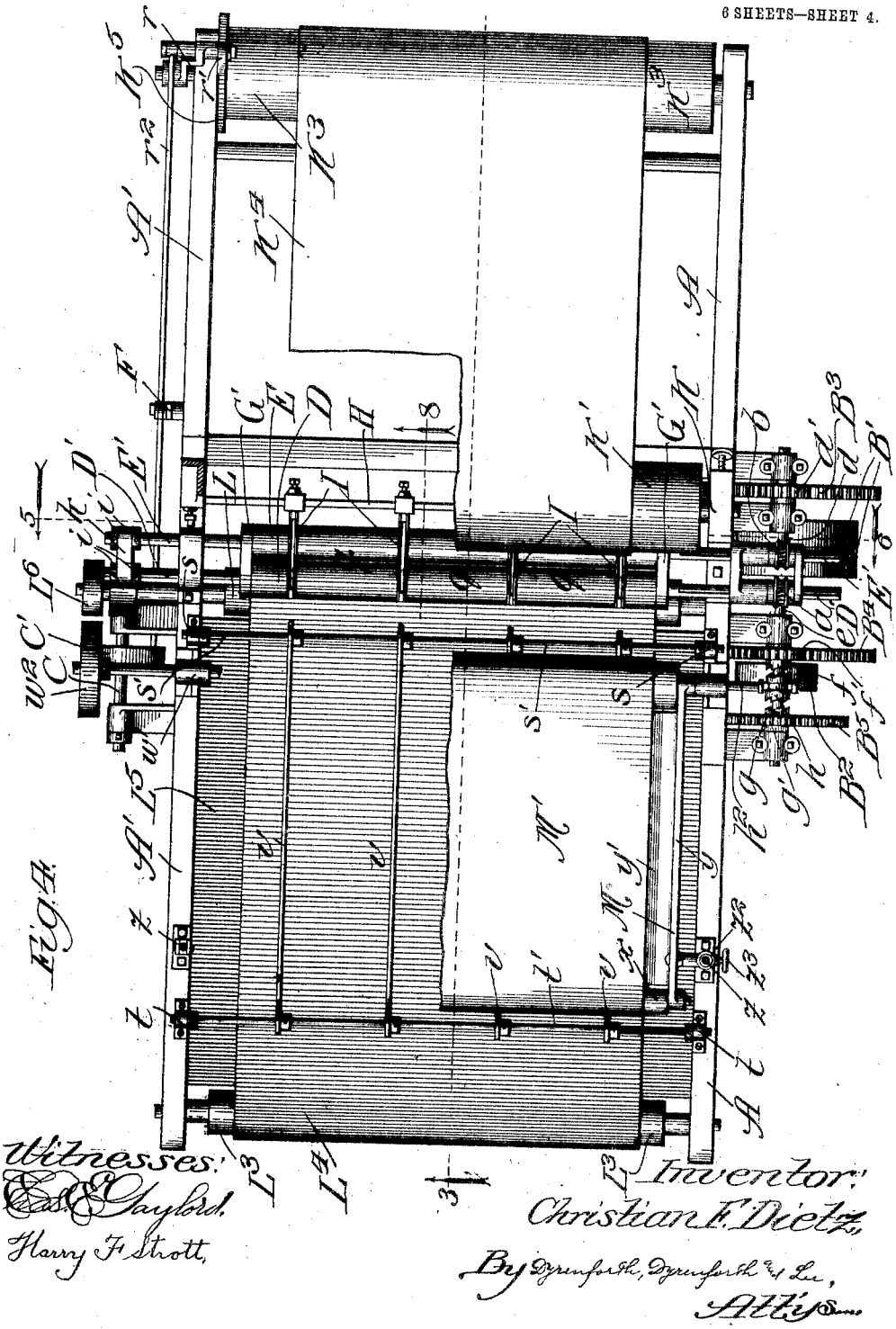

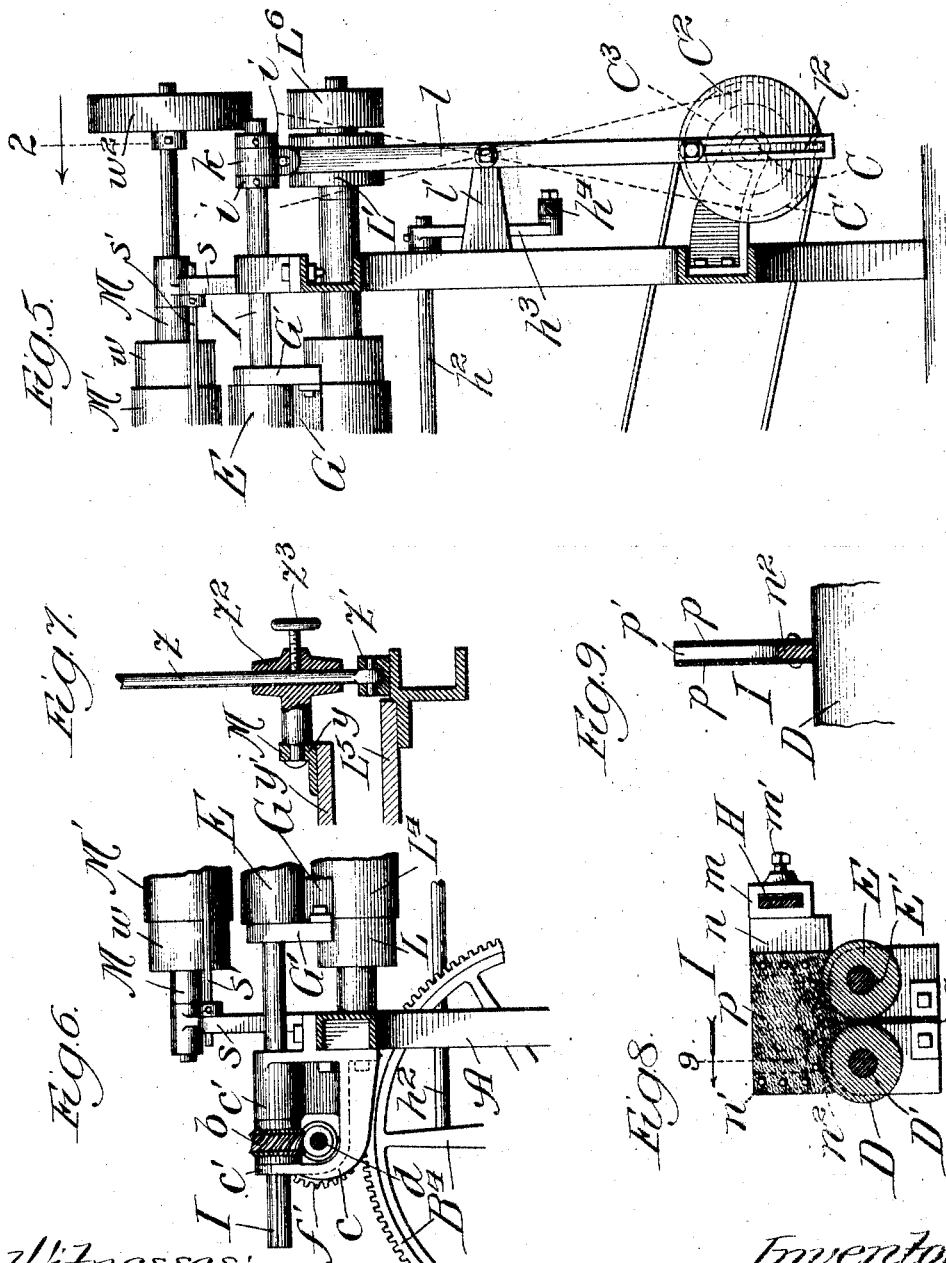

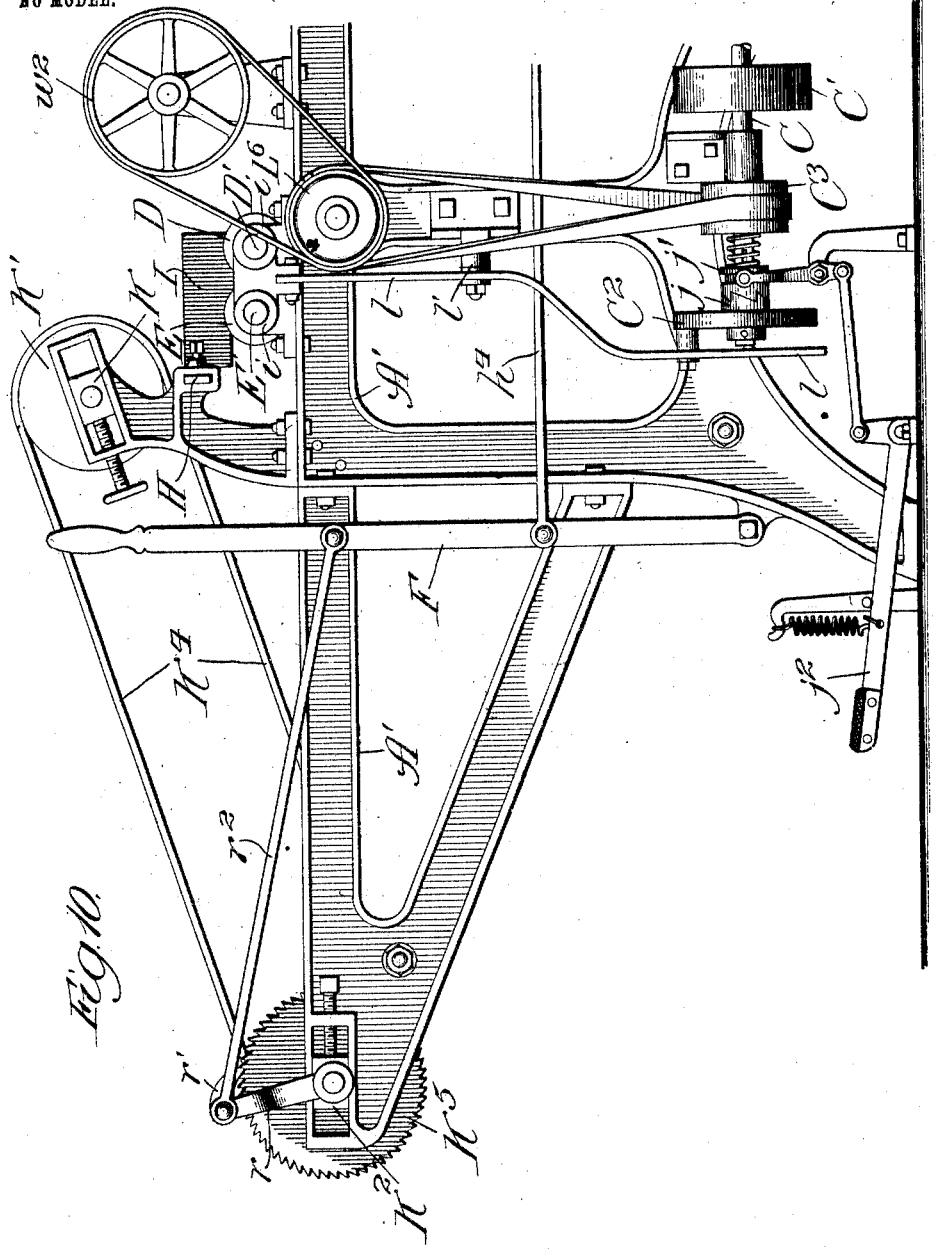

UNITED STATES PATENT OFFICE.

CHRISTIAN F. DIETZ, OF CHICAGO, ILLINOIS.

DOUGH-FORMING MACHINE.

SPECIFICATION forming part of Letters Patent No. 777,335, dated December 13, 1904.

Application filed September 19, 1904. Serial No. 225,038. (No model.)

*To all whom it may concern:*

Be it known that I, CHRISTIAN F. DIETZ, a citizen of the United States, residing at Chicago, in the county of Cook and State of Illinois, have invented a new and useful Improvement in Dough-Forming Machines, of which the following is a specification.

My invention relates to an improved method of as well as improved apparatus for forming lumps of finished dough into loaves for baking.

The invention, so far as the method is concerned, is in the nature of an enlargement of or improvement upon a method described in Letters Patent No. 766,431, granted to me August 2, 1904. My patented method, broadly and briefly stated, consists in drawing the surface of a lump of finished dough toward one, more especially the under, side thereof, thereby stretching the skin portion and applying the surplus skin to said side and simultaneously with the stretching compacting the lump. One preferred means for carrying out this method, as shown in the patent named and also in Patent No. 766,432, granted to me on the same day for a dough-forming machine, is to rest the lump upon and subject it to the action of a pair of friction-rollers which rotate toward each other, thereby drawing the skin from two sides and depositing it in the under side, a scraper provided between the rollers operating to prevent the passage of dough between them. In the machines illustrated in the patents the formed loaves are discharged by separating the rollers, thereby causing the loaves to drop between them. In a separate pending application for Letters Patent filed by me May 31, 1904, Serial No. 210,416, for a dough-forming machine I have shown and described a method subservient to the claims of my first patent cited and also means for forming a loaf from a lump of dough by confining the lump and subjecting it at one, more especially the under, side to reciprocating frictional drawing action against it without rotating the lump to stretch the skin portion, drawing the same from two sides, depositing the surplus thereof in said under side, and compacting the lump. The machines illustrated in my said patents and pending application are adapted more especially for forming loaves of the square or oblong types by drawing the skin from two sides only to the under side. I have found that by subjecting a lump of dough to the action of friction-rollers, as described in the patent, and simultaneously therewith to reciprocating frictional drawing action in the general manner described in the pending application referred to to stretch and draw the skin approximately from all sides to the under side I can produce therefrom loaves of the well-known oblong, square, cylindrical, round, or other types, resulting when baked in bread possessing in an enhanced degree the advantages of quality and appearance which characterize loaves of the square or oblong types formed by either of the methods above referred to when employed alone.

My present object is to employ in coöperative practice for the production of improved loaves the two methods defined.

It is further my object to provide a machine of simple and novel construction for carrying out my present improved method of forming loaves.

In the accompanying drawings, which illustrate a machine embodying my present improvements, Figure 1 is an elevation of one side of the machine; Fig. 2, an elevation of the opposite side of the machine with two of the shafts in section on line 2 in Fig. 5; Fig. 3, a longitudinal section taken on line 3 in Fig. 4 and viewed in the direction of the arrow; Fig. 4, a plan view of the machine with parts broken away to expose details which would otherwise be hidden; Fig. 5, an enlarged broken section taken on line 5 in Figs. 2 and 4; Fig. 6, an enlarged broken section taken on line 6 in Fig. 4; Fig. 7, an enlarged broken section taken on line 7 in Fig. 2; Fig. 8, an enlarged section taken on line 8 in Fig. 4; Fig. 9, an enlarged section taken on line 9 in Fig. 8; and Fig. 10, an enlarged broken side elevation of the machine, showing means for quickly starting and stopping reciprocation of the forming-rollers.

A A' are the side frames or cheeks of the machine held together by cross-extending bars and tie-rods, as indicated. The main drive-shaft B, journaled in brackets on the cheek A, carries fast and loose pulleys B' and also a pulley B², which is belted to a pulley C' to drive a counter-shaft C, journaled in brackets on the cheek A'. The shaft C carries a disk C².

D and E are parallel companion forming-rollers having friction-surfaces. They are fixed to rotary shafts D' E', passing through and journaled in boxes on the cheeks to have longitudinal as well as rotary movement therein.

Feathered upon the shafts D' E' are the worm-wheels $a$ $b$, respectively. The journal-boxes on the cheek A for the shafts are on a bracket $c$, which is also formed with stops $c'$, as indicated in Fig. 6, to hold the worm-wheels against longitudinal movement. The worm-wheel $b$ is driven by a worm-shaft $d$, carrying a pinion $d'$, meshing with a drive-gear B³ on the shaft B. The worm-wheel $a$ is driven by a worm on a shaft $e$. The shafts $d$ and $e$ are journaled in brackets on the cheek A and extend in alinement, but out of contact with each other. On the shaft $e$ is a loose sleeve or clutch member $f$, carrying a pinion $f'$, meshing with a gear-wheel B⁴ on the shaft B, and also loose upon the shaft $e$ is a sleeve or clutch member $g$, carrying a pinion $g'$, driven through an intermediate pinion $g²$ from a gear-wheel B⁵ on the shaft B. Feathered upon the shaft $e$ between the clutch members $f$ $g$ is a sliding clutch member $h$, actuated by an arm $h'$ on a rock-shaft $h²$, passing to the opposite side of the machine, where it carries an arm $h³$. The arm $h³$ is connected by a link $h⁴$ with an operating-lever F, fulcrumed at its lower end against the cheek A'.

In operation the forming-roller E is driven constantly in the direction of the arrow in Fig. 3 from the shaft B through the medium of the gears B³ $d'$, worm-shaft $d$, and worm-wheel $b$. When the lever F is swung from its intermediate position (shown in Fig. 2) toward the opposite end of the machine, the clutch-shifting mechanism described moves the clutch member $h$ into engagement with the clutch member $f$, causing the forming-roller D to be rotated from the shaft B in the opposite direction to the roller E through the medium of the gears B⁴ $f'$, worm-shaft $e$, and worm-wheel $a$. Swinging of the lever F in the direction opposite to that stated shifts the clutch member $h$ into engagement with the clutch member $g$, causing the shaft $e$ to be driven in the reverse direction by the shaft B through the medium of the gears B⁵ $g²$ $g'$ to reverse the roller D, whereby it turns in the same direction as the roller E to discharge loaves, as hereinafter described.

Confined between collars $i$ on the shafts D' E' is a block $k$, provided with openings fitting loosely around the said shafts. The block $k$ is pivotally connected at its under side with the upper end of a lever $l$, fulcrumed between its ends upon a bracket $l'$ and provided along its lower end portion with a slot $l²$. On the disk C², near its periphery, is a pin which passes loosely through the slot $l²$ of the lever $l$. In the rotation of the shaft C and consequent turning of the disk C² the lever $l$ is oscillated on the fulcrum $l'$ to reciprocate the block $k$, and consequently the rollers D E correspondingly. It will be clear that in this reciprocation the roller-shafts D' E' reciprocate through the worm-wheels $a$ $b$, which are feathered thereto and held, as described, against longitudinal movement.

Extending between the rollers D E in the manner shown is a scraper-plate G of the form in cross-section indicated in Figs. 3 and 8. This scraper-plate extends at its upper edge to a plane preferably somewhat higher than the plane of the centers of the rollers and the latter rotate freely at opposite sides thereof. The scraper or scraper-plate G is of the same length as the rollers and is fastened at its ends to plates or blocks G', fitting loosely over the shafts D' E' at the ends of the rollers. Thus in the longitudinal reciprocation of the rollers and their shafts the scraper moves with the rollers. The object of the scraper is to prevent dough from being drawn downward between the rollers, as hereinafter described.

Extending parallel with the rollers in the position shown and fastened at its opposite ends to the cheeks of the machine is a bar H, carrying a series of adjustable walls or partition-pieces I. Each partition-piece is formed of a frame having a head $m$ with an opening through it to fit around the bar H and having a set-screw $m'$ for fastening the partition-piece in adjusted position. The body portion of each partition-piece consists of the vertical end parts $n$ $n'$ and bottom part $n²$, which latter at its under edge is shaped to fit loosely over the tops of the rollers D E and meet or nearly meet the top edge of the scraper G. Fastened against opposite sides of each partition-frame are sheets of canvas or other suitable porous material $p$ $p$. The construction described presents a pocket $p'$ between the end parts $n$ $n'$ of the frame and between the porous sides $p$, the pocket being open at the top and adapted to contain dry flour or other suitable pulverulent material. As illustrated in the drawings, the partition-pieces I separate the space above the rollers D E into three compartments $q$, as illustrated most plainly in Fig. 4.

Journaled in companion adjustable belt-tightening boxes K at the tops of the cheeks is a shaft carrying a roller K', and journaled in companion belt-tightening journal-boxes K² at the feeding end of the frame is a shaft carrying a roller K³. A feed-belt K⁴ extends over the rollers, as shown, the said belt being of a width corresponding with the length of the rollers D E. On the shaft of the roller $K^3$ is a ratchet-wheel $K^5$. Fulcrumed on the said shaft at the side of the ratchet-wheel $K^5$ is a swinging arm $r$, carrying a ratchet-engaging pawl $r'$ and connected at its free end, by means of a link $r^2$, pivotally with the operating-lever F, as shown in Fig. 2. Movement of the lever F to bring about engagement between the clutch members $h f$ to cause the roller D to rotate in the direction opposite to the roller E causes the said lever to swing the arm $r$, so that the pawl will engage the ratchet and turn the roller $K^3$ part of a revolution. This turning of the roller $K^3$ advances the feed-belt $K^4$ to discharge lumps of dough into the compartments $q$, as hereinafter described.

At the center of the machine beneath the roller D is a roller L, the shaft of which carries a pulley $L'$ beyond the cheek $A'$, belted, as indicated in Fig. 10 and by dotted lines in Fig. 2, to a pulley $C^3$ on the counter-shaft C. Journaled in adjustable belt-tightening boxes $L^2$ at the ends of the cheeks of the machine is the shaft of a roller $L^3$. A discharge-belt $L^4$ extends around the rollers L $L^3$, as shown most plainly in Fig. 3. Beneath the upper stretch of the belt $L^4$, between the rollers L $L^3$, is a platform $L^5$, over which the belt slides and which prevents yielding thereof in the downward direction.

On the upper edge of the cheeks A $A'$ in the positions shown are a pair of standards $s$ and a pair of shorter standards $t$. The standards $s$ support a cross-rod $s'$ and the standards $t$ support a cross-rod $t'$. Adjustably fastened to these rods are parallel boards or partitions $v$ in line with the partition-pieces I. They are of the shape shown in side elevation in Fig. 3 and terminate at their lower sides in a plane closely above the belt $L^4$. The partitions $v$ will prevent long loaves as they are discharged from the compartments $q$ from joining together at their ends in the event they expand longitudinally when moved by the discharge-belt $L^4$.

The operation thus far described is as follows: Sealed lumps of finished dough to be formed into loaves preparatory to baking are placed upon the feed-belt $K^4$ in rows of three, so that in each movement of the said feed-belt described three of the lumps will be discharged from the belt and dropped into the compartments $q$ to rest upon the platform formed by the rollers D E. The movement of the lever F, which causes the lumps to be fed to the compartments, as described, also, as before stated, causes the forming-roller D to rotate in the direction opposite to the roller E, whereby both rollers at their upper sides move toward the scraper G. The friction-surfaces of the forming-rollers engage the skin portions of the lumps of dough and draw the same to the under sides of the lumps. The scraper prevents any of the dough from being drawn between the rollers. Consequently the surplus skin is deposited upward into the under sides of the lumps. The drawing of the skin portion from opposite sides (described) also has the effect of compacting the lump. The effect of this operation on the lumps in forming them into loaves is fully described in my aforesaid patents, and this subject need not be gone into in the present case. As before described, the forming-rollers while rotating also reciprocate correspondingly, thereby causing the lumps of dough in the compartments to be pressed first in one direction and then in the other against the walls or partitions I. The effect of this operation upon the ends of the lumps, as described in my aforesaid pending application, is to cause the skin portions of the said ends alternately to be drawn to the under sides of the lumps and deposited therein. A few rotations of the forming-rollers and impacts of the lumps against the partition-pieces result in giving to the lumps the shape approximately of a sphere. The number of turns of the rollers and impacts against the partitions will be governed by the operator according to the character of the dough. When the operation is completed, the lever F is swung to reverse the rotation of the roller D, causing it by its reverse movement to discharge the formed loaves onto the belt $L^4$, by which they are carried to the discharge end of the machine. Immediately that the formed loaves drop from the roller D onto the belt $L^4$ the operator may swing the lever back to feed three more lumps of dough to the compartments $q$ and form them as described. Each time a lump of dough strikes one of the partition-walls $q$ a little of the flour or the like contained in the receptacles $p'$ puffs through the walls and prevents the dough from sticking thereto. Some of the flour or the like thus supplied also drops onto the rollers D E, preventing the dough from sticking at the angles between the rollers and walls. When the more or less spherical loaves are taken from the discharge-belt $L^4$, they are caused to rest in pans or the like upon their sides, into which the surplus skin portions were deposited during the forming operation. After resting thus for awhile the top surfaces of the loaves sink more or less and the loaves enlarge in diameter, whereby when ready for the baking operation the loaves are flat at their under sides, convex at their upper sides, and more or less perfectly round in horizontal cross-section. If it is desired to form loaves of the square or rectangular types in horizontal cross-section, the lever $l$ may be disconnected from the disk $C^2$ to stop reciprocation of the forming-rollers. Thus only the rollers will operate upon the lumps of dough, causing them while being formed to elongate as far as the partitions or to a less extent, if it is desired, for example, to produce short tapering loaves. In the production of loaves of dough for certain kinds of bread it is desirable to submit the lumps to stretching of the skin portion from one side only. In such case the lever F may be moved to the intermediate position illustrated in Fig. 2, which holds the clutch member $h$ out of engagement with both the clutch members $f$ $g$. In this case only the roller E would rotate to stretch the skin portion of the lump, the roller D remaining immovable. To discharge the loaf, the lever F would be moved to throw the clutch member $h$ into engagement with the clutch member $g$ to turn the roller D, as previously described.

In order that the machine may be adapted also for forming cylindrical loaves, I provide the following mechanism: M is a vertically-swinging frame comprising a forward roller $w$ and a rear roller $w$. The shaft of the forward roller $w$ is journaled in standard $w'$ on the cheeks and carries a pulley $w^2$, adapted to be belted to a smaller pulley $L^5$ on the shaft of the roller L. The frame M has side bars $y$ pivotally mounted at one end upon the shaft of the roller $w$, and the shaft of the roller $w$ is journaled in the opposite ends of the said side bars. Extending around the rollers $w$ $w$ is a belt M' of the same width as the belt $L^4$. Between the side bars $y$ is a platform $y'$, across which the belt M' runs at its lower stretch to prevent upward yielding of the belt. On the cheek A' in the position shown is an upright swinging rod $z$, pivotally connected at $z'$ with the upper side of the cheek. Sliding upon the rod $z$ is a sleeve-piece $z^2$, pivotally connected with the adjacent side bar $y$ of the frame M. The sleeve may be fastened at any elevation upon the rod $z$ by means of a thumb-screw $z^3$. When it is desired to bring this mechanism into operation, the frame is lowered to the position shown in Fig. 3, the belt M' extending at its lower stretch in a backward inclined direction close to but out of contact with the outer edges of the partitions $r$. Owing to the difference in size between the pulleys $L^5$ $w^2$, the belt M' is driven at a speed approximating double that of the belt $L^4$, the adjacent stretches of the belts moving in the backward direction. When the loaves of dough are discharged from the forming-rollers onto the belt $L^4$, as described, and moved backward between the partitions $r$, they are engaged by the more rapidly traveling belt M' and rolled over and over. The gradually-diminishing space between the belts causes the loaves to be elongated to the partitions $r$ and to be discharged by the belt $L^4$ in the form of elongated cylinders.

I have found in practice that loaves of bread generally are greatly improved both in quality and appearance, no matter what their shapes may be, when in the forming operation the skin portion of the dough has been stretched and drawn to one side from all directions and without subjecting the loaf to pressure at its upper side during said operation. Thus in the production of square or oblong loaves what I consider the most desirable bread results, other things being equal, when the dough has first been formed into a sphere in the manner described and is then elongated, without rolling the lump, by continuing the stretching and drawing of the skin from two sides only. This operation may be readily performed with reasonable speed by providing the machine described with mechanism like that illustrated, for example, in Fig. 10, whereby the reciprocation of the rotating forming-rollers may be started and stopped at will. In the construction there shown the disk $C^3$ is loosely journaled upon the counter-shaft C and is formed at its hub with a clutch member $j$, normally engaged by a sliding spring-pressed clutch member $j'$, feathered upon the shaft. Pressure of the foot upon the clutch-disengaging lever $j^2$ shown disconnects and stops rotation of the disk $C^3$, thereby stopping reciprocation of the forming-rollers D E, and when the lever is released the springs shown return the parts to their normal positions. In operation after the three lumps of dough have been formed into spheres by the rotation and reciprocation of the forming-rollers, as described, pressure of the foot upon the lever $j^2$ stops reciprocation of the forming-rollers, causing them by their continued rotation to continue stretching the surface portion of the loaves from two sides only to the under side, thereby elongating the loaves, while reducing them in diameter. When sufficiently elongated, the loaves are discharged by reversing rotation of the roller D, as described.

The machine described may be employed, as stated, for making round loaves, square loaves, oblong loaves, or cylindrical loaves, and while I prefer to construct it throughout as shown it may be variously modified in the matter of details without departing from the spirit of my invention as defined by the claims.

What I claim as new, and desire to secure by Letters Patent, is—

1. The herein-described method of preparing a loaf from a lump of dough, which consists in drawing the surface of the lump simultaneously from three sides toward the under side thereof, thereby stretching the skin portion, applying the surplus skin to the said under side, and simultaneously with the stretching, compacting the lump.

2. The herein-described method of preparing a loaf from a lump of dough, which consists in drawing the surface of the lump simultaneously first from three sides toward the under side thereof, then simultaneously from two of said sides and a fourth side toward the under side thereof, thereby stretching the skin portion, applying the surplus skin to the said under side, and simultaneously with the stretching, compacting the lump.

3. The herein-described method of forming a cylindrical loaf from a lump of dough, which consists in drawing the skin portion of the lump from all sides toward the under side thereof without rotating the lump, thereby stretching the skin portion, applying the surplus skin to the said under side, and simultaneously with the stretching, compacting the lump into the shape approximately of a sphere, then subjecting the lump to a rolling action under pressure from opposite sides to elongate the loaf.

4. The herein-described method of forming a cylindrical loaf from a lump of dough, which consists in drawing the skin portion of the lump from all sides toward the under side thereof without subjecting the lump to pressure on its upper side, thereby stretching the skin portion, applying the surplus skin to the said under side, and simultaneously with the stretching, compacting the lump into the shape approximately of a sphere, then subjecting the lump to a rolling action under pressure from opposite sides to elongate the loaf.

5. In a machine for forming a loaf from a lump of dough, substantially as described, the combination of a pair of coöperating forming members presenting friction-surfaces forming a bearing for the lump, and holding it against turning, means operating to move one of said members in the direction toward the other member and the under side of the lump to form the loaf, and means operating thereafter to rotate one of said members on its axis in the direction away from said other member to discharge the loaf.

6. In a machine for forming a loaf from a lump of dough, substantially as described, the combination of a pair of coöperating forming-rollers presenting friction-surfaces forming a bearing for the lump, and holding it against turning, means operating to turn one of said rollers in the direction toward the other roller and the under side of the lump to form the loaf, and means operating thereafter to reverse the rotation of one of said rollers to discharge the loaf.

7. In a machine for forming a loaf from a lump of dough, substantially as described, the combination of a pair of coöperating rollers presenting friction-surfaces forming a bearing for the lump, and holding it against turning, means operating to rotate said rollers in the direction toward one side of the lump, and means operating to move the said lump alternately in opposite directions longitudinally of the rollers, for the purpose set forth.

8. In a machine for forming a loaf from a lump of dough, substantially as described, the combination of a compartment, a pair of coöperating correspondingly reciprocable rollers forming the base of the compartment, means operating to rotate said rollers in the direction toward one side of the lump, and means for reciprocating said rollers, substantially as and for the purpose set forth.

9. In a machine for forming a loaf from a lump of dough, substantially as described, the combination of a compartment, rollers presenting friction-surfaces forming the base of said compartment, means operating to rotate said rollers in the direction of one side of the lump, means operating to reciprocate the said rollers longitudinally, and means for reversing the rotation of one of said rollers, substantially as and for the purpose set forth.

10. In a machine for forming a loaf from a lump of dough, a compartment for the lump having porous powder-supplying walls, a platform having a friction-surface forming the base of the compartment, and means for reciprocating the platform or walls one with relation to the other, substantially as and for the purpose set forth.

11. The improved dough-forming machine comprising, in combination, mechanism which forms a lump of dough into a loaf of approximately spherical shape by drawing the surface portion to the under side thereby stretching the skin and compacting the loaf, and mechanism into which such loaf is passed and by which it is rolled bodily under pressure to elongate the loaf.

12. The improved dough-forming machine comprising, in combination, mechanism which forms a lump of dough into a loaf of approximately spherical shape by drawing the surface portion to the under side thereby stretching the skin and compacting the loaf, and means operating to change the loaf from a spherical to an elongated shape before it is discharged from the machine, by drawing the surface portion from two opposite sides only to the under side.

13. In a dough-forming machine the combination of mechanism for forming a lump of dough into an approximately spherical loaf by stretching and drawing the surface portion from more than two sides to the under side, and means for stopping the operation of part of said mechanism to draw the surface portion of the spherical loaf from two sides only to the under side thereby elongating the loaf.

14. In a machine for forming a loaf from a lump of dough, substantially as described, the combination of a compartment having porous walls and carrying receptacles for flour or the like, a pair of coöperating rollers presenting friction-surfaces forming the base for the compartment, means operating to rotate said rollers in the direction toward one side of the lump, and means for producing impacts between the walls and opposite ends of the lump, substantially as and for the purpose set forth.

15. In a machine for forming a loaf from a lump of dough, substantially as described, the combination of a pair of coöperating rollers presenting friction-surfaces forming a bearing for the lump, and holding it against turning, means operating to rotate said rollers in the direction toward one side of the lump, a traveling discharge-belt extending from one side of said roller, and a traveling loaf-rolling belt above the discharge-belt and at an angle thereto to present a gradually-decreasing space between the belts, the belts moving at different speeds, substantially as and for the purpose set forth.

CHRISTIAN F. DIETZ.

In presence of—
WALTER N. WINBERG,
M. I. MACKENZIE.